(12) United States Patent
Cha

(10) Patent No.: US 7,463,186 B1
(45) Date of Patent: Dec. 9, 2008

(54) RADIO WAVE TRANSMISSION/RECEPTION DEVICE FOR VEHICLES

(75) Inventor: Dong Eun Cha, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/966,046

(22) Filed: Dec. 28, 2007

(30) Foreign Application Priority Data

Oct. 2, 2007    (KR) ...................... 10-2007-0099364

(51) Int. Cl.
*G01S 13/08* (2006.01)
(52) U.S. Cl. ......................................... 342/70; 342/118
(58) Field of Classification Search .................. 342/70, 342/118
See application file for complete search history.

(56) References Cited

U.S. PATENT DOCUMENTS

2004/0227663 A1* 11/2004 Suzuki et al. ................. 342/70

FOREIGN PATENT DOCUMENTS

JP        2004312696 A  * 11/2004

\* cited by examiner

*Primary Examiner*—Dan Pihulic
(74) *Attorney, Agent, or Firm*—Morgan, Lewis & Bockius LLP

(57) ABSTRACT

A radio wave transmission/reception device capable of detecting an obstacle in front of a vehicle using radio waves is disclosed. The device includes a radio wave transmission/reception unit; a radio wave reflection unit installed around the radio wave transmission/reception unit and changing the direction of the radio waves such that the radio waves can be propagated forwards from the vehicle; a radio wave rectilinear propagation guide unit installed in front of the radio wave reflection unit and guiding rectilinear propagation of the radio waves; and a viewing window installed in front of the radio wave rectilinear propagation guide unit and oriented toward the radiator grille. The radio wave rectilinear propagation guide unit has an inductive film parallel to the viewing window, with at least a reflection protrusion formed on the inductive film. The device improves the rectilinearity of radio wave propagation and improves the appearance of the radiator grille.

12 Claims, 3 Drawing Sheets

RADIO WAVE TRANSMISSION/RECEPTION DEVICE FOR VEHICLES

CROSS-REFERENCE TO RELATED APPLICATIONS

This application claims priority to Korean Application No. 10-2007-0099364, filed on Oct. 2, 2007, the disclosure of which is incorporated herein by reference.

BACKGROUND OF THE INVENTION

1. Field of the Invention

The present invention relates, in general, to a radio wave transmission/reception device for vehicles and, more particularly, to a radio wave transmission/reception device for vehicles, which can increase the rectilinearity of propagation of radio waves, thus avoiding errors in distance measurement caused by noise and improving the appearance of vehicles.

2. Description of the Related Art

In recent years, a variety of Intelligent Driver Assistance Systems (IDAS) designed to provide safety and comfort to drivers, such as Car Navigation Systems (CNS), Lane Departure Warning Systems (LDWS), Sleepy Alarm Systems (SAS) and Collision Avoidance Systems (CAS), have been actively studied and developed.

The Intelligent Driver Assistance System (IDAS) typically uses a radio wave sensor to detect obstacles in front of a traveling vehicle. Particularly, a radio wave sensor transmits radio waves having a wavelength of 1-10 millimeters in a desired direction and receives radio waves reflected by an obstacle in front of a vehicle and determines the distance between the vehicle and the obstacle, so that the radio wave sensor can quickly detect and analyze the situation in front of the vehicle even when the situation is not within the field of vision of a driver, thus being preferably and widely used.

To secure the desired operational reliability of Adaptive Cruise Control Systems (ACCS), it is very important to provide a technique of accurately transmitting and receiving radio waves and determining the precise distance between the driver's car and the car facing immediately ahead. Thus, in the prior art, the development of techniques related to ACCS has focused on the improvement of the shapes and materials of a variety of devices, which may impede the transmission/reception of radio waves during the process of transmitting/receiving the radio waves.

An example of prior art techniques related to the present invention is a radio wave sensor disclosed in Japanese Patent Laid-open Publication No. 2004-312696. The radio wave sensor disclosed in No. 2004-312696 was proposed to solve the problem experienced in conventional techniques due to noise detected when radio waves having a wavelength of 1-10 millimeters are transmitted to materials around the sides of a vehicle and the waves reflected by the materials are received.

In the radio wave sensor, a radio wave transmission/reception antenna is installed such that it is oriented forwards relative to the vehicle. Further, in the radio wave sensor, a layer having a dielectric loss or a magnetic loss higher than that of the front surface of a radar cover is embedded in the side surface of the radar cover, or the side surface of the radar cover is made of a material having a relative dielectric constant higher than that of the front surface of the transmission/reception antenna.

However, the prior art radio wave sensor disclosed in Japanese Patent Laid-open Publication No. 2004-312696 is problematic in that, although the radio waves transmitted from the radio wave transmission/reception antenna are partially intercepted by the side surfaces of the radar cover, the radio waves do not propagate rectilinearly, but disperse while propagating forwards. Thus, when the dispersed radio waves are reflected backwards by obstacles and are received by the radio wave sensor, noise is undesirably received by the radio wave sensor along with the reflected radio waves.

Further, in the prior art technique, the transmission/reception antenna cover is made of a simple plastic material, so that, when the antenna cover is mounted on the front of a vehicle, it spoils the appearance of the vehicle.

Thus, in the related art, it is required to develop a radio wave transmission/reception device for vehicles that can prevent the dispersion of radio waves transmitted from and received by a radio wave sensor, thus reducing noise received along with the reflected radio waves by the radio wave sensor, and can determine the precise distance between a vehicle and an obstacle in front of the vehicle, and can improve the appearance of the vehicle.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made in an effort to solve the aforementioned problems associated with prior arts, and provides a radio wave transmission/reception device for vehicles, which can reliably and quickly detect obstacles in front of a vehicle, thereby preventing the occurrence of traffic accidents.

The present invention also provides a radio wave transmission/reception device for vehicles, which is installed inside a radiator grille, thus preventing the appearance of a vehicle from suffering, and improving the appearance of the vehicle.

In order to achieve the above features, according to an embodiment of the present invention, there is provided a radio wave transmission/reception device for vehicles, comprising: a radio wave transmission/reception unit; a radio wave reflection unit installed at a predetermined location near the radio wave transmission/reception unit and changing the directions of radio waves transmitted from the radio wave transmission/reception unit such that the radio waves can be propagated forwards from a vehicle; a radio wave rectilinear propagation guide unit installed in front of the radio wave reflection unit and guiding rectilinear propagation of transmitted/received radio waves; and a viewing window installed in front of the radio wave rectilinear propagation guide unit and oriented toward a radiator grille of the vehicle, wherein the radio wave rectilinear propagation guide unit is provided with an inductive film parallel to the viewing window, with at least a reflection protrusion formed on a surface of the inductive film facing the viewing window.

The radio wave reflection unit may comprise a reflection tube having a hollow chamber therein with an opening defined in one end of the reflection tube, and the radio wave transmission/reception unit may be placed at a location substantially near the opening of the reflection tube so that the radio waves can be transmitted into or from the hollow chamber.

The radio wave reflection unit may comprise a reflection tube having a hollow chamber, the reflection tube comprising multiple layers, which are a reflection layer and a support layer made of materials having different relative dielectric constants.

The reflection layer may be provided on a surface thereof with a metal layer formed of gold, silver or chrome through a plating process.

The reflection layer may be made of PP (polypropylene), and the support layer is made of PPX (poly-p-xylene) or PBT (polybutylene terephthalate).

The radio wave rectilinear propagation guide unit may comprise at least a reflection protrusion formed on the inductive film, each of the reflection protrusions having a prism lens shape with a triangular cross-section and comprising a first layer formed on the outer surface and a second layer formed on the inner surface of the first layer and made of a material having a relative dielectric constant different from that of the material of the first layer.

The radio wave rectilinear propagation guide unit may comprise at least a reflection protrusion formed on the inductive film, each of the reflection protrusions having a Fresnel lens shape.

The reflection protrusions may be configured such that the bottom surface of the first layer, parallel to the inductive film, reflects the radio waves into the hollow chamber of the reflection tube and at least a side surface of the first layer, inclined relative to the inductive film, reflect the radio waves so as to transmit the radio waves from the hollow chamber forwards from the vehicle or receive the radio waves backwards from the front of the vehicle into the hollow chamber.

The inductive film may be made of polycarbonate or polymethyl methacrylate.

The first layer of the reflection protrusions may be made of the same material as that of the reflection layer of the reflection tube, and the second layer may be made of the same material as that of the support layer integrated with the reflection layer.

The viewing window may be made of a transparent plastic plate having high radio wave transmissivity.

The viewing window may be made of the same material as that of the inductive film of the radio wave rectilinear propagation guide unit.

Thus, the present invention is advantageous in that, due to the cooperation of a radio wave reflection unit with a radio wave rectilinear propagation guide unit, the property of rectilinear propagation of radio waves, transmitted to detect an obstacle in front of a traveling vehicle, is improved, so that the present invention can prevent the generation of noise-induced errors during the transmission/reception of the radio waves, and can improve the appearance of the vehicle due to the mirror effects of a viewing window.

Further, the hollow chamber of the radio wave reflection unit can rectilinearly transmit the radio waves forwards from the vehicle over a large area and can rectilinearly receive the radio waves, thus efficiently transmitting and receiving the radio waves.

Further, the reflection tube of the radio wave reflection unit is configured to have multiple layers, which are a reflection layer and a support layer made of materials having different relative dielectric constants, thus having an excellent reflection property.

In the present invention, the reflection layer is provided on a surface thereof with a metal layer formed of gold, silver or chrome through a plating process, thus improving the appearance of the vehicle.

The present invention also provides an excellent radio wave reflection property and can be produced at low cost. Further, when the reflection layer is formed as a black layer, the reflection layer can provide mirror effects.

Further, the radio wave rectilinear propagation guide unit is provided with at least a reflection protrusion formed on an inductive film and having a prism lens structure. Each of the reflection protrusions comprises a first layer formed on the outer surface of each of the protrusions, and the second layer formed on the inner surface of the first layer and made of a material having a relative dielectric constant different from that of the material of the first layer, so that the radio wave rectilinear propagation guide unit can rectilinearly transmit the output radio waves forwards from the vehicle and can efficiently guide the input radio waves, reflected by an obstacle, to the radio wave transmission/reception unit.

Further, in the radio wave rectilinear propagation guide unit of the present invention, each of the reflection protrusions provided on the inductive film has a Fresnel lens structure, thus rectilinearly transmitting the output radio waves forwards from the vehicle and efficiently guiding the input radio waves reflected by an obstacle to the radio wave transmission/reception unit.

Further, the bottom surface of the first layer of each of the reflection protrusions, which is parallel to the inductive film, can reflect the radio waves into the hollow chamber of the reflection tube, and the inclined side surfaces of the first layer can reflect the output radio waves transmitted from the hollow chamber such that the output radio waves can be rectilinearly propagated forwards from the vehicle, and can reflect the input radio waves such that the input radio waves can be received into the hollow chamber. Thus, the reflection protrusions minimize the radio wave loss, rectilinearly reflect the output radio waves forwards from the vehicle, and efficiently guide the input radio waves reflected by an obstacle to the radio wave transmission/reception unit.

Further, the inductive film of the present invention is made of polycarbonate or polymethyl methacrylate, so that the inductive film can efficiently transmit the radio waves and can provide mirror effects in cooperation with the viewing window.

In the present invention, the first layer of each of the reflection protrusions is made of the same material as that of the reflection layer of the reflection tube, and the second layer of each of the reflection protrusions is made of the same material as that of the support layer integrated with the reflection layer, so that the radio wave transmission/reception device for vehicles of the present invention can provide a high radio wave reflection property and can be produced at low cost.

Further, the viewing window of the present invention is made of a transparent plastic plate having excellent radio wave transmissivity, so that the viewing window can efficiently transmit the radio waves and provides mirror effects. Thus, the viewing window can prevent the radio wave transmission/reception device, installed in the back of the radiator grille, from spoiling the appearance of the vehicle.

Further, the viewing window is made of the same material as that of the inductive film of the radio wave rectilinear propagation guide unit, thus efficiently transmitting the radio waves. Further, the viewing window can be easily integrated with the inductive film, and can be produced at low cost.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
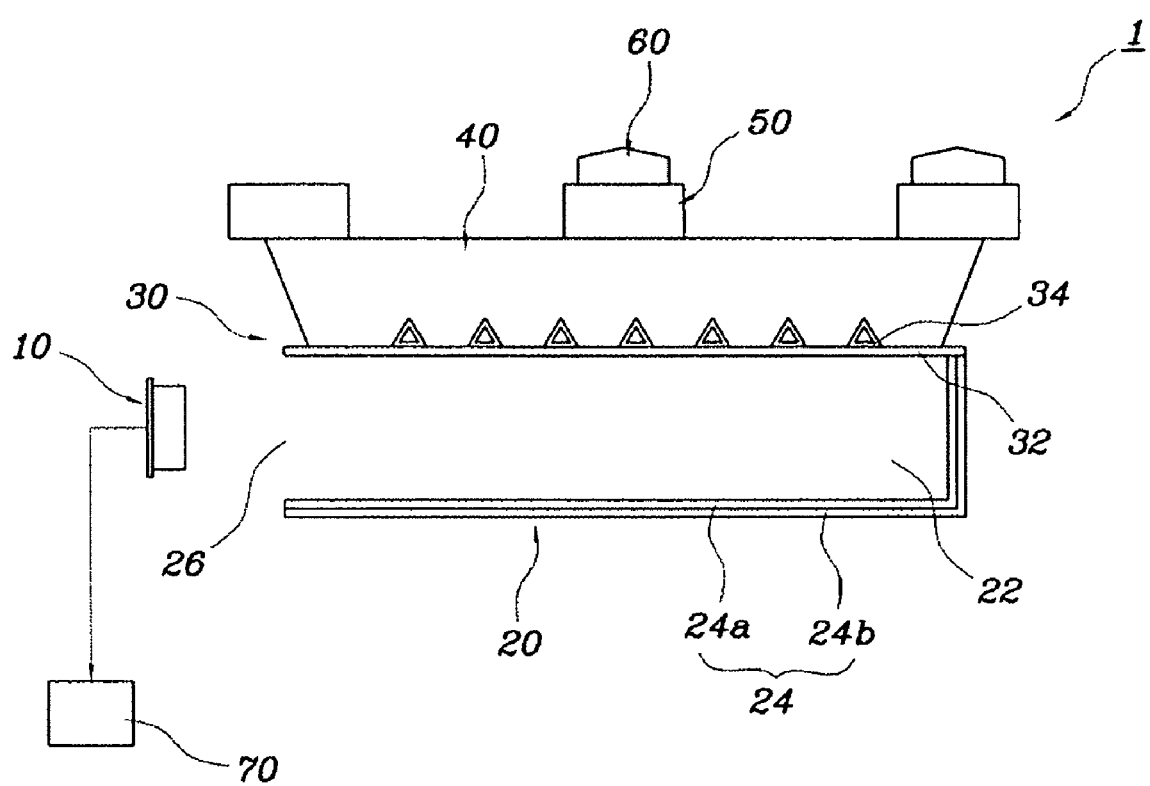
FIG. 1 is a sectional view illustrating a radio wave transmission/reception device for vehicles according to an exemplary embodiment of the present invention.

It should be understood that the appended drawings are not necessarily to scale, presenting a somewhat simplified representation of various preferred features illustrative of the basic principles of the invention. The specific design features of an exemplary embodiment of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 2:
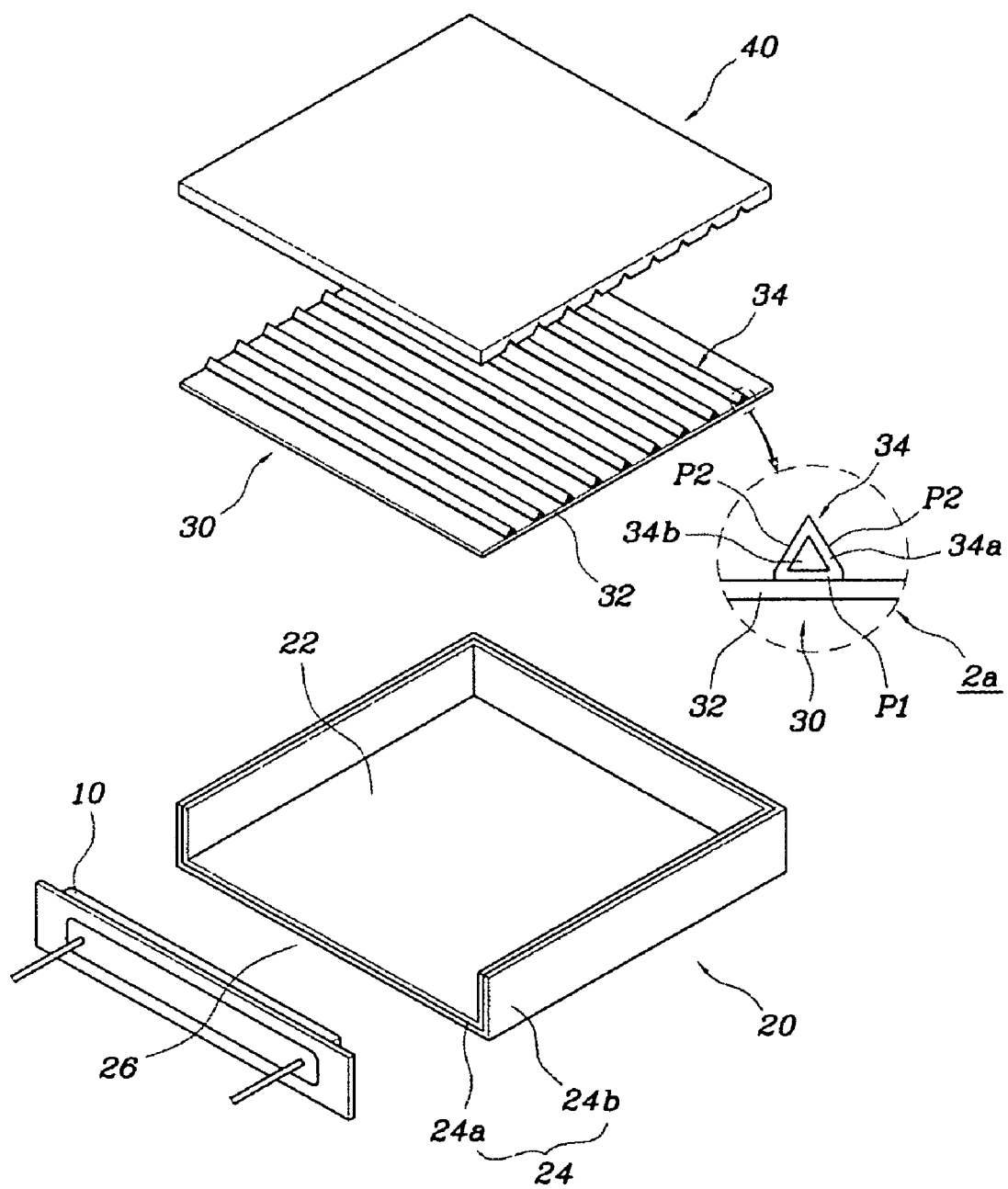
FIG. 2 is an exploded perspective view illustrating the assembled structure of a radio wave transmission/reception unit, a radio wave reflection unit, a radio wave rectilinear propagation guide unit and a viewing window of the radio wave transmission/reception device for vehicles according to an exemplary embodiment of the present invention.
Figure 3:
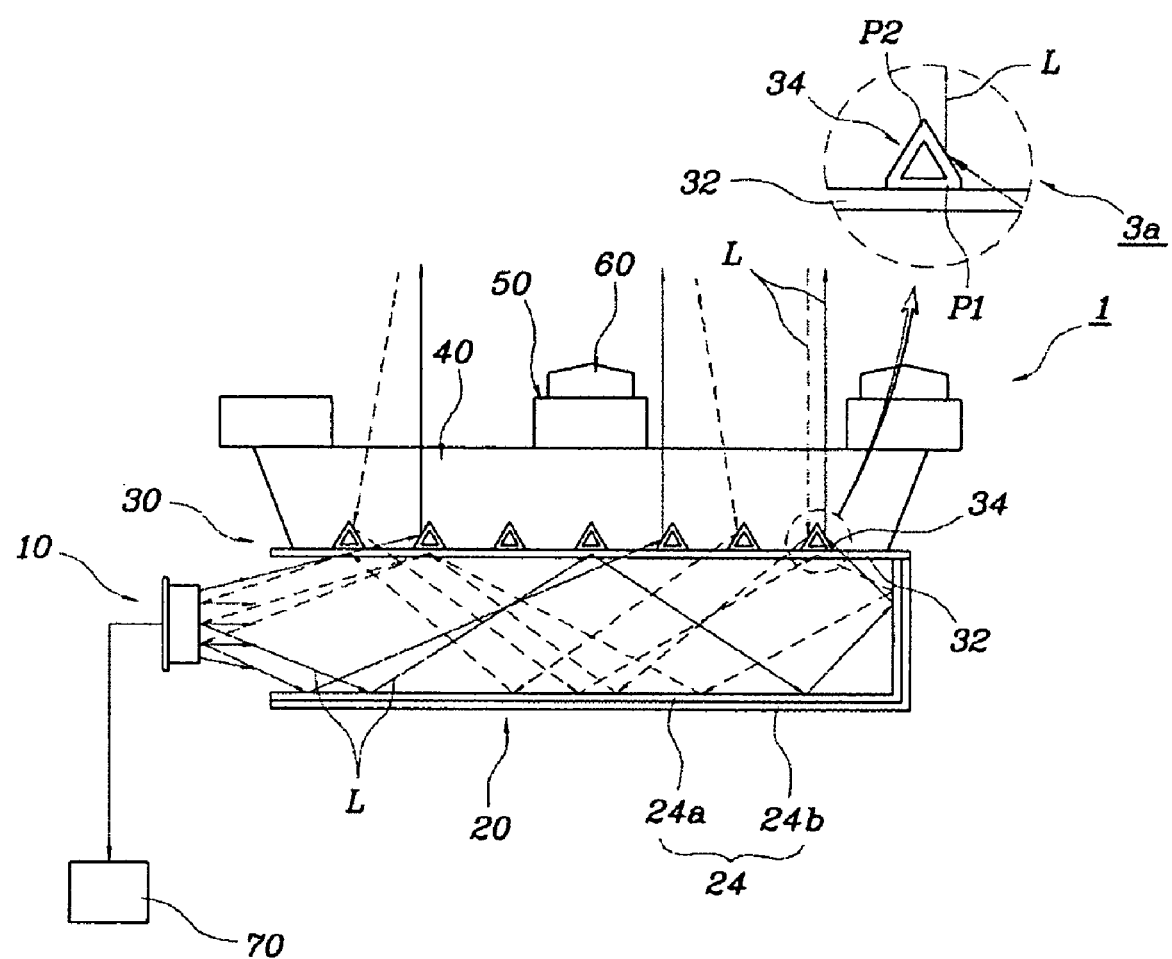
FIG. 3 is a sectional view illustrating the operation of the radio wave transmission/reception device for vehicles according to an exemplary embodiment of the present invention.

FIG. 1 is a sectional view illustrating a radio wave transmission/reception device 1 for vehicles according to an exemplary embodiment of the present invention. FIG. 2 is an exploded perspective view illustrating the assembled structure of a radio wave transmission/reception unit, a radio wave reflection unit, a radio wave rectilinear propagation guide unit and a viewing window of the radio wave transmission/reception device for vehicles according to an exemplary embodiment of the present invention. FIG. 3 is a sectional side view illustrating the operation of the radio wave transmission/reception device 1 for vehicles according to an exemplary embodiment of the present invention.

The radio wave transmission/reception device 1 according to an exemplary embodiment of the present invention comprises a radio wave transmission/reception unit 10, which transmits radio waves L outwards and/or receives radio waves L transmitted from an outside source. In other words, the radio wave transmission/reception unit 10 transmits and/or receives radio waves L having a wavelength of 1-10 millimeters.

At a predetermined location around the radio wave transmission/reception unit 10, a radio wave reflection unit 20 is installed to guide the radio waves, transmitted from the radio wave transmission/reception unit 10, forwards from a vehicle. As shown in FIG. 2, the radio wave reflection unit 20 is provided with a reflection tube 24 having a hollow chamber 22 therein, and reflects the radio waves L received in the reflection tube 24.

The reflection tube 24 comprises multiple layers made of materials having different relative dielectric constants. Described in detail, a reflection layer 24a is formed on the inner surface of the reflection tube 24 facing the hollow chamber 22, and a support layer 24b is formed on the outer surface of the reflection layer 24a.

The reflection layer 24a and the support layer 24b of the reflection tube 24 have a high radio wave reflection property, in proportion to the difference in the relative dielectric constant between them. For example, if the reflection tube 24 is made of plastic materials, the reflection layer 24a is preferably made of PP (polypropylene) and the support layer 24b is preferably made of PPX (poly-p-xylene). The above-mentioned materials have a high difference between therebetween, 0.7~0.8, in the relative dielectric constant and can be purchased cheaply.

Alternatively, the reflection layer 24a of the reflection tube 24 may be made of PP (polypropylene), and the support layer 24b may be made of PBT (polybutylene terephthalate). As a further alternative, the reflection layer 24a and the support layer 24b of the reflection tube 24 may be made of other opaque plastic materials.

The reflection layer 24a and the support layer 24b of the reflection tube 24 may be formed into an integrated body through a double injection molding process or an insert injection molding process. When the reflection layer 24a is formed as a black layer, the layer 24a provides mirror effects in cooperation with a viewing window 40, thus improving the appearance of the vehicle.

Further, the reflection layer 24a may be provided on the surface thereof with a metal layer formed of gold, silver or chrome through a plating process.

In the radio wave reflection unit 20, an air zone is formed in the hollow chamber 22 and an opening 26 is defined in one end portion of the reflection tube 24. Further, the radio wave transmission/reception unit 10 is placed at a location substantially near the opening 26 and a radio wave rectilinear propagation guide unit 30 is placed in front of the reflection tube 24 in the drawing.

Therefore, output radio waves L radiated from the radio wave transmission/reception unit 10, which is installed around the hollow chamber 22, propagate forwards from the vehicle while being transmitted through the radio wave rectilinear propagation guide unit 30 placed in front of the reflection tube 24. Meanwhile, input radio waves L are received by the radio wave transmission/reception unit 10 after passing through the radio wave rectilinear propagation guide unit 30 and the hollow chamber 22.

The radio wave rectilinear propagation guide unit 30 is provided with at least a reflection protrusion 34 positioned on a flat upper surface of an inductive film 32. The reflection protrusions 34 provided on the inductive film 32 are configured to have a prism lens-shaped cross-section or a Fresnel lens-shaped cross-section, capable of creating the rectilinear propagation of the radio waves.

As shown in FIG. 2, when the radio wave rectilinear propagation guide unit 30 has a prism lens-shaped structure, each of the reflection protrusions 34 provided on the inductive film 32 is configured to have a longitudinal structure having a triangular cross-section. Further, as shown by the enlarged portion 2a in FIG. 2, each of the reflection protrusions 34 comprises a first layer 34a, formed on the outer surface of each of the protrusions 34, and a second layer 34b, which is formed inside the first layer 34a and is made of a material having a relative dielectric constant different from that of the first layer 34a.

Here, the reflection protrusions 34 are located such that the bottom surface P1 of the first layer 34a of each of the protrusions 34, which is parallel to the surface of the inductive film 32, can reflect the radio waves L into the hollow chamber 22 of the reflection tube 24, and the side surfaces P2, inclined relative to the inductive film 32, can rectilinearly reflect the radio waves L forwards from the vehicle.

The first layers 34a of the reflection protrusions 34 are preferably made of the same material as that of the reflection layer 24a of the reflection tube 24. Further, the second layers 34b are preferably made of the same material as that of the support layer 24b, integrated with the reflection layer 24a.

Thus, the first layer 34a and the second layer 34b of the reflecting protrusions 34 have a high difference therebetween, 0.7~0.8, in the relative dielectric constant, so that all of the radio waves L incident upon the first layer 34a are reflected by the surface of the first layer 34a.

The inductive film 32 may be made of a transparent plastic plate having a low relative dielectric constant. For example, the inductive film 32 may be made of polycarbonate or polymethyl methacrylate.

Further, while forming the reflection protrusions 34 on the inductive film 32, the first layer 34a and the second layer 34b are sequentially coated or vapor-deposited on the inductive film 32, thus being integrated into a single body.

Further, the viewing window 40 is provided on the front surface of the radio wave rectilinear propagation guide unit 30. The viewing window 40 is mounted to the rear surface of a radiator grille 50.

The viewing window 40 may be made of the same transparent plastic plate as that of the inductive film 32 of the radio wave rectilinear propagation guide unit 30. For example, the viewing window 40 may be made of a material having a low relative dielectric constant, such as polycarbonate or polymethyl methacrylate.

The viewing window 40 preferably has a thickness of about 5 mm and is preferably attached to the inductive film 32 of the radio wave rectilinear propagation guide unit 30 through laser welding or ultrasonic welding, or using an adhesive.

Further, the radio wave transmission/reception device of an exemplary embodiment of the present invention includes a processor 70, which is electrically connected to the radio wave transmission/reception unit 10, determines whether an obstacle is present in front of the traveling vehicle or not, using radio waves L transmitted from and received by the radio wave transmission/reception unit 10, and controls the speed of the vehicle or informs the driver of the presence of the obstacle in front of the vehicle.

The operational effect of the radio wave transmission/reception device of an exemplary embodiment of the present invention having the above-mentioned construction will be described herein below.

As shown in FIG. 3, the radio wave transmission/reception device 1 of an exemplary embodiment of the present invention is installed behind the radiator grille 50 placed in front section inside the engine room of a vehicle. Here, the logo 60 of the vehicle manufacturer is typically mounted onto the front surface of the radiator grille 50, so that, when a person views the logo 60 from the outside of the vehicle, the person can appreciate the improved appearance of the vehicle due to the transparent viewing window 40 installed behind the logo 60.

For example, when the viewing window 40 and the inductive film 32 of the radio wave rectilinear propagation guide unit 30 attached to the viewing window 40 are made of transparent materials, and the inner surface of the reflection tube 24 of the radio wave reflection unit 20 is made of opaque black PP (polypropylene) and opaque black PPX (poly-p-xylene), the viewing window 40 provides an improved appearance which can be expected from a tinted mirror.

Further, the inner surface of the reflection tube 24 may be provided with a metal layer formed on gold, silver or chrome through a plating process. In the above state, the inner surface of the reflection tube 24 becomes bright and improves the appearance of the vehicle.

To detect an obstacle present in front of a traveling vehicle, the radio wave transmission/reception device 1 of an exemplary embodiment of the present invention outputs radio waves L from the radio wave transmission/reception unit 10. The output radio waves L are received in the hollow chamber 22 of the radio wave reflection unit 20 placed around the radio wave transmission/reception unit 10.

When the radio waves L in the hollow chamber 22 of the radio wave reflection unit 20 are incident upon the bottom surfaces P1 of the first layers 34a of the reflection protrusions 34, the radio waves L are reflected by the bottom surfaces P1 into the hollow chamber 22, as shown in FIG. 3. However, when the radio waves L output from the hollow chamber 22 are incident upon the inclined side surfaces P2 of the reflection protrusions 34, the radio waves L are reflected by the side surfaces P2 and are rectilinearly propagated forwards from the vehicle, as shown by the enlarged portion 3a in FIG. 3.

During the above-mentioned process, the directions of the radio waves L output from the radio wave transmission/reception unit 10 are changed by the inductive film 32 and the prism lens structure of the reflection protrusions 34 of the radio wave rectilinear propagation guide unit 30, so that the radio waves L can be propagated rectilinearly forwards through the viewing window 40.

When the radio waves L propagated forwards from the vehicle are incident upon an obstacle in front of the traveling vehicle, the radio waves L are reflected backwards. The reflected radio waves L pass through the viewing window 40 and are received as input waves into the radio wave reflection unit 20 through the radio wave rectilinear propagation guide unit 30, which is mounted to the rear surface of the viewing window 40 and has the prism lens structure.

In the above state, the input radio waves L are incident upon the inclined side surfaces P2 of the first layers 34a of the reflection protrusions 34 and are reflected into the hollow chamber 22 of the radio wave reflection unit 20. The input radio waves L in the hollow chamber 22 are repeatedly reflected inside the hollow chamber 22 and are received by the radio wave transmission/reception unit 10, which is placed around the radio wave reflection unit 20.

Briefly described, the radio waves L can rectilinearly propagate forwards from the vehicle to an obstacle due to the combined structure of the radio wave reflection unit 20 and the radio wave rectilinear propagation guide unit 30, and are reflected backwards by the obstacle and received by the radio wave transmission/reception unit 10.

The radio wave signal received by the radio wave transmission/reception unit 10 is transmitted to the processor, such as a microcomputer. Upon receiving the input radio wave signal, the processor operates the data of the signal and determines the distance between the vehicle and the obstacle, and thereafter, controls the running speed of the vehicle or informs the driver of the presence of the obstacle in front of the vehicle.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A radio wave transmission/reception device for vehicles, comprising:
   a radio wave transmission/reception unit;
   a radio wave reflection unit installed at a predetermined location near the radio wave transmission/reception unit and changing directions of radio waves transmitted from the radio wave transmission/reception unit such that the radio waves can be propagated forwards from a vehicle;
   a radio wave rectilinear propagation guide unit installed in front of the radio wave reflection unit and guiding rectilinear propagation of transmitted/received radio waves; and
   a viewing window installed in front of the radio wave rectilinear propagation guide unit and oriented toward a radiator grille of the vehicle;
   wherein the radio wave rectilinear propagation guide unit is provided with an inductive film parallel to the viewing window, with at least a reflection protrusion formed on a surface of the inductive film facing the viewing window.

2. The radio wave transmission/reception device for vehicles according to claim 1, wherein the radio wave reflection unit comprises a reflection tube having a hollow chamber therein with an opening defined in one end of the reflection tube, and the radio wave transmission/reception unit is placed at a location near the opening of the reflection tube so that the radio waves can be transmitted into or from the hollow chamber.

3. The radio wave transmission/reception device for vehicles according to claim 1, wherein the radio wave reflection unit comprises a reflection tube having a hollow chamber, and multiple layers, which are a reflection layer and a support layer made of materials having different relative dielectric constants.

4. The radio wave transmission/reception device for vehicles according to claim 3, wherein the reflection layer is provided on a surface thereof with a metal layer formed of gold, silver or chrome through a plating process.

5. The radio wave transmission/reception device for vehicles according to claim 4, wherein the reflection layer is made of PP (polypropylene), and the support layer is made of PPX (poly-p-xylene) or PBT (polybutylene terephthalate).

6. The radio wave transmission/reception device for vehicles according to claim 1, wherein the radio wave rectilinear propagation guide unit comprises at least a reflection protrusion formed on the inductive film, each of the reflection protrusions having a prism lens shape with a triangular cross-section and comprising a first layer formed on an outer surface and a second layer formed inside the first layer and made of a material having a relative dielectric constant different from that of the material of the first layer.

7. The radio wave transmission/reception device for vehicles according to claim 1, wherein the radio wave rectilinear propagation guide unit comprises at least a reflection protrusion formed on the inductive film, each of the reflection protrusions having a Fresnel lens shape.

8. The radio wave transmission/reception device for vehicles according to claim 6, wherein the reflection protrusions are configured such that a bottom surface of the first layer, parallel to a surface of the inductive film, reflects the radio waves into the hollow chamber of the reflection tube and at least a side surface of the first layer, inclined relative to the inductive film, reflects the radio waves so as to transmit the radio waves from the hollow chamber forwards from the vehicle or receive the radio waves backwards from the front of the vehicle into the hollow chamber.

9. The radio wave transmission/reception device for vehicles according to claim 8, wherein the inductive film is made of polycarbonate or polymethyl methacrylate.

10. The radio wave transmission/reception device for vehicles according to claim 8, wherein the first layer of the reflection protrusions is made of the same material as that of the reflection layer of the reflection tube, and the second layer is made of the same material as that of the support layer integrated with the reflection layer.

11. The radio wave transmission/reception device for vehicles according to claim 1, wherein the viewing window is made of a transparent plastic plate having high radio wave transmissivity.

12. The radio wave transmission/reception device for vehicles according to claim 11, wherein the viewing window is made of the same material as that of the inductive film of the radio wave rectilinear propagation guide unit.

* * * * *